United States Patent Office 3,241,568
Patented Mar. 22, 1966

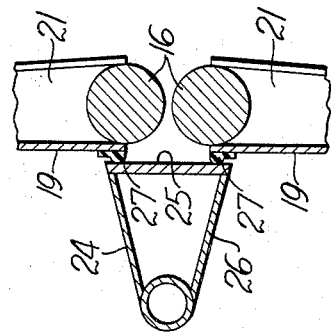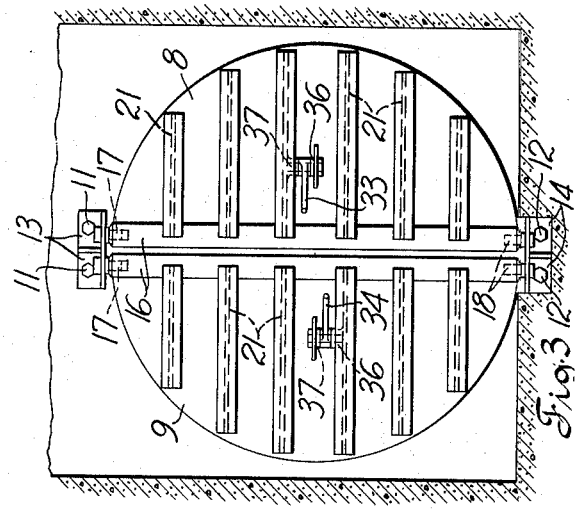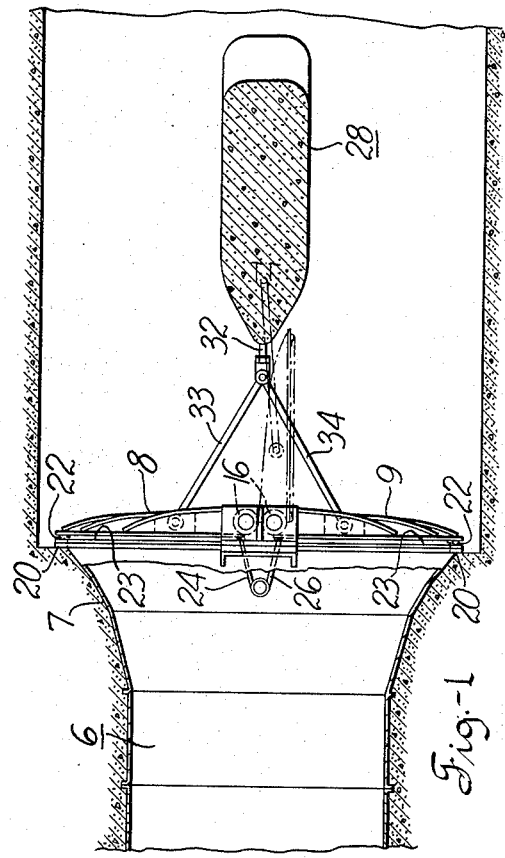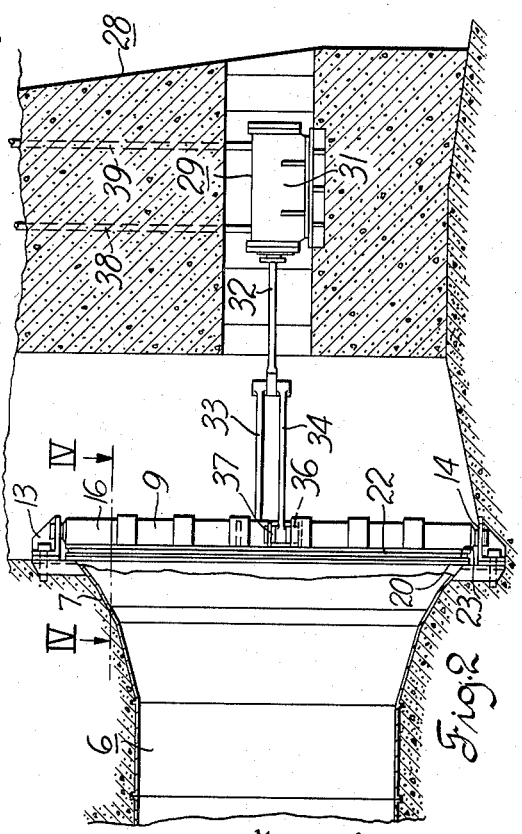

3,241,568
VALVE AND OPERATING MECHANISM THEREFOR
Howard A. Mayo, Jr., York, Pa., assignor to Allis-Chalmers Manufacturing Company, Milwaukee, Wis.
Continuation of application Ser. No. 222,791, Sept. 11, 1962. This application Sept. 4, 1964, Ser. No. 396,464
2 Claims. (Cl. 137—601)

This invention pertains in general to hydraulic valves and more particularly to a butterfly type of valve, however, differing therefrom in that the present valve has a pair of swinging half sections which are opened and closed to permit or interrupt the flow of fluid through a confined path and is a continuation of application Serial No. 222,-791, filed September 11, 1962, by Howard A. Mayo, Jr., entitled "Valve and Operating Mechanism Therefor," now abandoned.

One of the main problems in designing a valve of the rotating or pivotal type, such as ball or butterfly valves, is providing an adequate seal about the valve trunnion, that is, the pivot shaft of the valve. Since this shaft must extend without the fluid confining path so that a valve operator may be attached thereto, it is necessary to provide a seal between the rotating shaft and the stationary valve housing. This has caused considerable difficulty and expense and numerous designs have been directed to this particular sealing problem.

It is a general object of the subject invention to provide a valve having a pair of pivotal valve disks wherein the operating mechanism for the valve does not require a rotatable member to extend without the fluid flow path.

A further object of the subject invention is to provide a valve of the hereinbefore described type wherein the operating mechanism is positioned within the fluid flow path.

A more specific object of the subject invention is to provide a valve of the hereinbefore described type wherein the valve operating mechanism is attached to the individual valve disks and operates the disks by exerting a pushing and pulling force thereon.

A further object is to provide a valve having a very flat or narrow width in the flow direction so the valve will occupy only a minimum of space in the flow path.

An additional object of the subject invention is to provide a valve of the hereinbefore described type wherein the valve operating mechanism is connected to each valve disk through a scissors type linkage arrangement wherein linear movement of the valve operator results in a pivoting movement of the valve disks.

These and other objects of the subject invention will become more fully apparent when the following description is read in light of the attached drawings, wherein:

FIG. 1 is a plan view of a hydraulic installation showing the novel valve and valve operating mechanism in closed position in solid lines and one valve disk in the open position shown in phantom lines;

FIG. 2 is a side elevation of the hydraulic installation taken at right angles to the cross section shown in FIG. 1;

FIG. 3 is an end view of the hydraulic installation taken at right angles to both FIGS. 1 and 2; and FIG. 4 shows a portion of FIG. 2 taken along the lines IV—IV.

Referring to the drawings, the subject invention is shown for purposes of illustration as being encased in concrete and includes a water confining pipe or passsage generally designated 6. The end of the pipe may be flared out into a throat 7 to correspond substantially to the size of closure members or valve disks 8 and 9.

Each valve disk is shown herein for purposes of illustration as being individually pivotally mounted in pivot support brackets 13 and 14 rigidly connected to the foundation structure in any conventional manner such as by bolts 11 and 12. Each valve disk is preferably identical in configuration and as herein shown for purposes of illustration is provided with a vertically disposed support member 16. Both ends of the support members 16 may be drilled and reamed to receive pivot pins 17 and 18. These pivot pins may be rigidly connected to the pivot support brackets 13 and 14 in any conventional manner such as by welding. With this particular type of arrangement, the valve may be assembled by positioning the valve disks 8 and 9 in the lower pivot support brackets 14 on the pins 18. The pivot pins 17 are then inserted into the upper reamed openings of the support members 16 and the pivot support brackets 13 may then be bolted to the concrete casing. The weight of each disk may be carried by the lower pivot pins 18 or bearing collars may be provided at the lower ends of the supports 16.

It should be understood that this is only one suggested arrangement for connecting the valve disks for pivotal movement and any number of different types of pivotal connections may be employed without departing from the spirit of the invention. An apparent alternate arrangement would be to provide a single vertically disposed support member 16 with the valve disks 8 and 9 connected to this single support in the manner of a hinge. The particular manner of supporting the valve disks for pivotal movement is not considered a part of the invention and the individual mounting of each valve disk is shown herein for purposes of illustration only.

Each valve disk may be provided with a face 19 which may be of plate steel and is rigidly connected in any conventional way, such as by welding, to one side of each support 16. The configuration of each valve disk corresponds to half of the size of the outlet or flared portion 7 of the tube 6. In the preferred embodiment as herein shown for purposes of illustration only, each valve disk is formed in the shape of a half circle. Horizontally disposed ribs 21 are rigidly connected to each valve disk 8 and 9 and the supports 16 to provide added strength thereto.

Each valve disk face 19 is provided with a seal 22 which may be of any conventional form and is herein shown as a strip of resilient material connected to the axially disposed face of each valve disk about the periphery thereof. A valve seating surface 23 is provided about the flared outlet 7 of the tube 6 and is attached to an annular flange or shoulder member 20. In order to affect a seal between the supports 16, two vertical support ribs 24 and 26 are provided. As shown in FIG. 4, the ends of ribs 24 and 26 are spaced apart a distance substantially parallel to the spacing between supports 16 and are joined by a sealing surface 25. This surface 25 mates with vertically disposed resilient seal portions 27 disposed along the vertical center sections of the valve disks to provide a fluid tight seal between the supports 16.

On one side of the valve and in the water path is a vertically disposed support pier generally designated 28. The portion of this support pier facing the valve disks is provided with a streamlined configuration so as not to impart turbulence to the flow of water thereby. Supported within this pier is a valve operating mechanism herein shown as a conventional servomotor 29. The servomotor 29 is composed of a cylinder 31 having a piston therein and may be of the conventional double acting hydraulic type. An axially disposed opening through the pier 28 provides access to the servomotor 29 and also provides an opening through which the servomotor piston rod 32 extends.

To the free end of the piston rod 32 are pivotally connected two connecting links 33 and 34. The remote end of each of the connecting links 33 and 34 is pivotally connected to a valve disk. This connection may be of any conventional type and as herein shown for purposes of illlustration each valve disk is provided with spaced brackets or journals 36 and 37 having aligned pivot pin receiving openings therein. The ends of the connecting links 33 and 34 are positioned between the spaced brackets 36 and 37 and are provided with openings therethrough in which are received pivot pins which are held in the brackets in any conventional manner.

Pressurized fluid from a source (not shown) is delivered to the double acting servomotor cylinder 31 through the fluid lines 38 and 39. When it is desired to close the valve, fluid is admitted through the line 39 causing the piston rod 32 to extend and pivot both valve disks into a closed position as shown in solid lines in the drawings. The seal 22 on each valve disk is forced against the complementary seating surface 23 at the end of the flared portion 7 of the pipe and fluid flow through the pipe 6 is interrupted. When it is desired to open the valve, pressurized fluid is admitted through the line 38 to the forward portion of the servomotor cylinder 31 causing the piston rod 32 to move to the right drawing each valve disk away from the respective seating surface and into the position shown in phantom lines in FIG. 1. It is preferred that the forward configuration of the support pier 28 blend with the configuration of the valve disks 8 and 9 and be positioned closely adjacent to the disks when they are in the open position so as not to create turbulence in the fluid.

With this arrangement, no rotating parts are required to pass without the water path and the most difficult sealing problem in a rotary valve is, therefore, overcome. Furthermore, because of the positioning of the valve operating mechanism axially and centrally of the valve disks, the large torque or twisting forces that are normally imparted to the pivot axis of the valve in conventional types of valve operating mechanisms have been overcome. This overcomes the necessity of providing large trunnions for the valve disk to pivot on and hence reduces the thickness of both the valve disks and body. Since the valve disks may be quite narrow, they do not present much of a flow obstruction when in the open position. Furthermore, since large trunnions are not necessary, this valve has, in effect, overcome the need of a valve body, the only equivalent structure being the brackets 13 and 14 and the seating surfaces 23 and 25.

Although only one embodiment of the subject invention has been shown and described herein, it will be apparent to those skilled in the art after reading this description that various modifications may be made thereto without departing from the spirit of the invention as defined in the claims appended hereto.

Having now particularly described and ascertained the nature of my said invention and the manner in which it is to be performed, I declare that what I claim is:

1. A valve structure for controlling fluid flow through a fluid confining passage comprising: a shoulder member having a throat therethrough, said member including a transverse element extending across said throat at substantially the midportion thereof; a pair of disks in said throat; means pivotally connecting said disks to said transverse element for swinging movement between open and closed positions to permit and interrupt, respectively, the flow of fluid through said throat; said transverse elements and disks being constructed and arranged so that the disks lie in juxtaposition along the flow axis of the flow passage when they are fully opened; a support pier positioned in said fluid confining passage, said pier being spaced from said transverse element a distance substantially equal to the pivot radius of said disk and having a thickness substantially equal to the combined thickness of said disks when the disks are fully opened; a valve operator mounted on said support pier in substantial alignment with said transverse element and including a member capable of movement toward and away from said disks; and a pair of links each having a corresponding end pivotally connected to a valve disk and the other ends pivotally connected to said member to cause said disks to open and close as said actuating member is moved, the ends of said valve disks adjacent said support pier and said support pier being constructed and arranged to form a smooth substantially continuous surface when said disks are in the open position to lessen turbulence in the fluid flowing thereby.

2. The valve structure set forth in claim 1 wherein the adjacent end of said support pier is tapered and nestled between said valve disks when said disks are in the open position.

References Cited by the Examiner
UNITED STATES PATENTS

| 1,659,880 | 2/1928 | Kauffman | 251—212 |
| 2,320,007 | 5/1943 | Otto | 98—40 |
| 2,938,533 | 5/1960 | Jensen et al. | 137—219 |

ISADOR WEIL, *Primary Examiner.*

MARTIN P. SCHWADRON, *Examiner.*